Feb. 11, 1964     R. M. LUCAS     3,120,938

HANGER

Filed Sept. 14, 1962

INVENTOR.
RAYMOND M. LUCAS

United States Patent Office 3,120,938
Patented Feb. 11, 1964

3,120,938
HANGER
Raymond M. Lucas, Lorain, Ohio, assignor to Gregory Industries, Inc., Lorain, Ohio
Filed Sept. 14, 1962, Ser. No. 223,787
8 Claims. (Cl. 248—68)

The present invention relates generally to hangers and more particularly to weldable hangers for securely supporting elongated objects.

The present invention finds particular utility in supporting elongated objects from structural members making up the particular building or structure in which the object is used.

Some examples of such members are strung electrical cables, conduits, pipes, and reinforcing steel. Since the invention is used to great advantage in supporting electrical cables, a substantial portion of the succeeding discussion will be directed to this application, it being recognized that the invention has other applications such as those suggested above.

Prior proposals for hangers for elongated objects have been made of several pieces and are time-consuming to use, making them expensive both in their initial cost and in the labor necessary to complete a job of hanging these objects. One prior proposal for a hanger includes a collar stud which is welded to the support structure and threaded to receive a nut. A banding hanger is secured to the collar stud by the nut. A piece of banding is then looped through the banding hanger and around the object supported. The object banding is drawn tight and a banding buckle clasps together the overlapping portions of the banding to secure the object in place.

In addition to being complex and rather awkward to use, such prior hangers are of little assistance to the installing workmen in supporting the objects in place before securement. During the installation of an electrical or other system with prior hangers it is necessary to tie the object to each banding hanger with a piece of string as the object is being installed. Tying the object to the hanger for temporary support often requires two workmen, one to hold and the other to tie. Also, such temporary supports often break or become untied requiring still more of the workmen's time. Thus, such prior hangers are generally unsatisfactory both during and after installation of the cable.

The present invention provides a hanger which is extremely simple in structure and equally simple to install. The hanger is a single-piece unit ready to be secured to the supporting structure as by any of the stud end welding techniques. Moreover, the present hanger is used to support the object during installation without tying the object to the hanger.

The hanger of the invention has a suitably shaped clamping member secured to a supporting stud. In a preferred form the clamping member is somewhat U-shaped with an end weldable stud end welded to one leg. The clamping member and stud are provided as an integral unit ready to be welded to the supporting structure by stud end welding techniques. Once welded to the supporting structure the clamping member provides an open hook for slidably supporting strung portions of an object while the remaining portions of the object are strung into place. Portions of the clamping member are adapted to be bent or crimped over the objects to secure such objects in place when the installation is complete. Thus, the hanger of the present invention is utilized beneficially both during and after installation of the objects. It may be quickly installed at a minimum of cost of materials and labor. Further time is saved as the securement of the objects is quickly accomplished by tightly wrapping the crimping portions of the clamping member over the objects with a pair of channel-lock pliers or other suitable tool. Thus, both the installation of the hanger and the objects are greatly simplified. Further, with an electrical cable especially, and with other objects as well this clamping not only provides vertical support for the object but also clamps the object against longitudinal movement. This is especially advantageous with electrical cable and other similar readily deformable objects because the clamping will tend to flatten the cable somewhat enhancing the resistance to longitudinal movement of the supported object.

In another form the cable hanger is formed with a pair of off-set oppositely extending leg portions having an end weldable stud secured to the adjacent portions of the leg members. The leg members are bendable partially around the outer two of several parallel objects to a mutually extending position.

Accordingly, a feature of the present invention is to provide a new and improved hanger of a unit construction readily connectable to the supporting structure.

Another feature of the present invention is to provide a new and improved hanger which is of a unit construction and alone supports the object or objects during installation in addition to permanently securing such object or objects in place once the installation is complete.

Still another feature of the present invention is to provide a new and improved hanger wherein the clamping portions of the hanger are easily and quickly bendable to secure the object into place.

Yet another feature of the present invention is to provide a new and improved unit object hanger wherein the clamping portion of the hanger securely supports several objects in a parallel manner.

Other features and a fuller understanding of the invention may be had by referring to the following description and claims taken in conjunction with the accompanying drawings in which:

Figure 1:
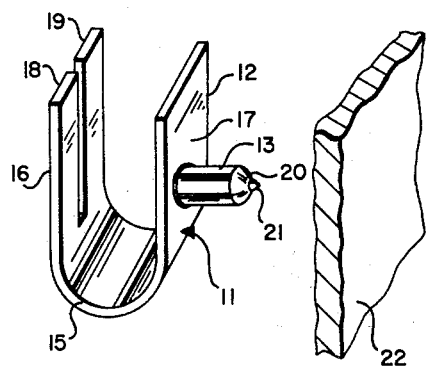
FIGURE 1 is a perspective view of one form of the hanger of the invention about to be stud welded to a supporting structure.
Figure 2:
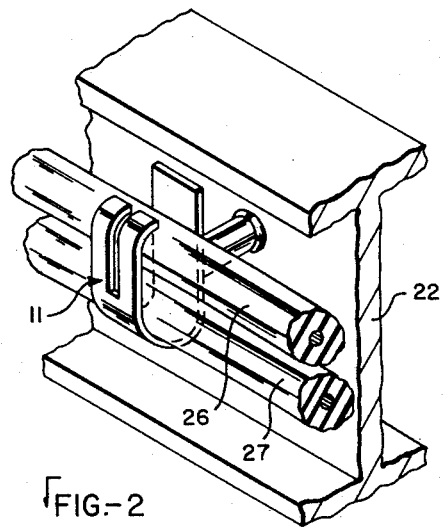
FIGURE 2 is a perspective view of the hanger of FIGURE 1 welded to a supporting structure and securely supporting electric cables therein.

Referring now to FIGURES 1 and 2, a stud weldable cable hanger is indicated generally by the reference character 11. The cable hanger 11 is designed to carry two cables 26, 27.

The cable hanger 11 includes a U-shaped clamping member 12 and a member supporting arm in the form of a stud 13 which is end weldable at both ends. The U-shaped member 12 includes a bent, or curved portion 15 and two leg portions 16, 17. The leg portion 16 is split into two crimping members or fingers, 18, 19. Splitting the leg portion 16 into the crimping members 18, 19 makes the leg portion 16 easily bendable to assure a complete and secure wrap around the cables 26, 27 laid therein.

The end weldable stud 13 is end welded to the leg portion 17. The opposite end 20 of the stud is adapted to be end welded to a cable support structure for installation at the job site. This opposite end 20 is of an arc meltable, weldable grade of metal and has the general shape of a frustrum of a cone. The welding end 20 terminates in a conical extension 21. The welding end 20 will be fluxed in one of the usual manners such as that taught in Nelson Patent 2,402,659 or that taught in Jenkins Patent 2,883,215. A typical application of the stud weldable hanger 11 is shown in FIGURE 2. Here the hanger 11 is end welded to the web 22 of a support structure in the form of an I-beam 23.

Once the hanger 11 is welded to a supporting structure, such as the I-beam 23, the cables or other elongated members may be strung by merely laying them into the U-shaped hanger 12. The hanger 12 supports the cables and permits them to slide while their remaining portions are being strung. Once the cables are permanently in position they are firmly locked in place by securely wrapping the crimping members 18, 19 over the top cable 26. The securement of the cables 26, 27 by bending the crimping members is easily accomplished by using a suitable tool such as a pair of channel-lock pliers.

Figure 3:
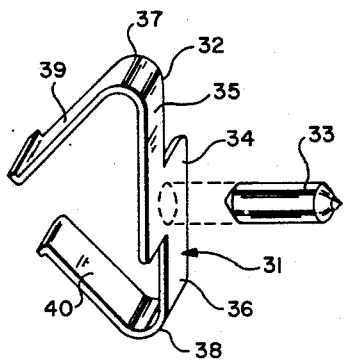
FIGURE 3 is a perspective view of another form of the hanger of the invention.
Figure 4:
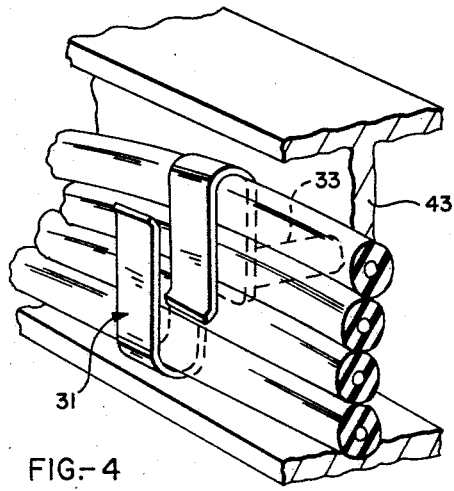
FIGURE 4 is a perspective view showing the hanger of FIGURE 3 welded to a supporting structure and securely clamping four parallel cables therein.

FIGURE 3 shows a hanger 31 used to support four cables in parallel. The four cable hanger 31 includes a clamping member 32 and an end weldable stud 33. The clamping member 22 includes a center base 34. The leg portions 35, 36 include bent, or curved, portions 37, 38 and clamping portions 39, 40, respectively.

The end weldable stud 33 is similar to the end weldable stud 13 above, and is welded to the base portion 34. The four cable hanger 31 is secured to a support structure 43 by stud end welding.

Accordingly, the present invention may be briefly described as comprising essentially a clamping member suitably shaped to carry elongated objects during installation and including bendable portions to secure the objects in place once installed, and a supporting arm preferably in the form of an end weldable stud welded to the clamping member and adapted for securement to a supporting structure by a stud end welding technique. The invention further contemplates that the clamping member will be of a unit construction including portions thereof suitably formed to carry a desired number of objects and easily bendable to secure such objects in place.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A hanger comprising:
   (a) a clamping member formed from a plate of substantially uniform thickness, said clamping member having a pair of leg portions and a curved portion connecting said leg portions, said leg and curved portions defining an open U-shape for receiving and loosely retaining a plurality of strung elongated objects so as to permit them to easily move longitudinally in the clamping member;
   (b) elongated end weldable stud means having one end welded to the back of one of said leg portions and the other end weldable to a metal support by a stud end welding technique, said stud means extending substantially perpendicularly from said one leg portion and spacing said clamping member from the metal support when welded thereto;
   (c) the back of said one leg portion being substantially greater in area than the cross-sectional area of the stud means and extending beyond the entire periphery of the stud means;
   (d) the other of said leg portions being split into a plurality of bendable fingers; and
   (e) the entire clamping member except the split portions of said other leg member being relatively rigid and immovable when the fingers are bent so that the bending the clamping member is controlled and confined to the fingers whereby bending the fingers over elongated objects strung in the clamping member fixes the objects parallel to said one leg portion and maintains them in a neat aligned relation.

2. The combination comprising:
   (a) a metallic support member;
   (b) an end weldable stud having one end stud end welded to said support member with the longitudinal axis of said stud disposed generally horizontally;
   (c) a plate-like clamping member of substantially uniform thickness and having a back welded to the stud and disposed transversely with respect thereto, the clamping member also having a retaining portion disposed transversely with respect to said axis and a curved portion connecting said back and said retaining portion so that together they define an open generally U-shaped clamping member for receiving and loosely supporting a strung, elongated object so as to permit the object to easily move longitudinally in the clamping member;
   (d) the back of said clamping member being fixed to the other end of said stud so that the U-shape clamping member is in an upright object-holding position;
   (e) at least part of said portion of the clamping member being bendable toward said back and upon the object to substantially close the clamping member and secure the object in the clamping member and prevent longitudinal movement of the object; and,
   (f) the back of said plate-like clamping member being greater in lateral dimension than said portions so as to be relatively rigid and substantially immovable when said portions are bent so that bending of the plate-like clamping member is controlled and confined to said portions whereby bending said portions over the elongated object fixes the objects parallel to said back portion and maintains them in a neat aligned relation.

3. A hanger comprising:
   (a) a generally U-shaped plate-like clamping member having a back, a curved portion, and a retaining portion somewhat paralleling said back; said back, said curved portion and said retaining portion defining an open U-shape for receiving and loosely retaining a plurality of strung elongated objects so as to permit them to easily move longitudinally in the clamping member;
   (b) elongate end weldable stud means welded to said back and extending substantially perpendicularly therefrom, the weldable end of the stud means being adapted for welding to a metal support by a stud end welding technique:
   (c) said back having an area substantially greater than the cross-sectional area of said stud means and extending beyond the entire periphery of said stud means;
   (d) the weldable end of the stud means being substantially spaced from its fixed end to space the clamping member from the support and to permit the stud means as fixed to said clamping member to be releasably secured in the chuck of a stud welding gun used in the stud end welding technique;
   (e) said back being relatively rigid and immoveable; and,
   (f) said retaining portion including at least one finger having a width substantially less than the width of said back so that said finger is bendable and bending of the clamping member is controlled and confined to said finger whereby bending the finger over the elongated objects strung in the plate-like clamping member fixes the objects parallel to said back and maintains them in a neat aligned relation.

4. A hanger for supporting a plurality of strung elongated objects comprising:
   (a) a plate-like clamping member including:
      (i) a back; and,
      (ii) a pair of clamping legs, offset and oppositely extending from said back,
   (b) said legs including bent portions and clamping portions, the legs having non-clamping positions wherein said clamping portions extend outwardly from said back and inward from their respective opposite ends of the back;

(c) said back, said bent portions and said clamping portions in their non-clamping positions forming an open hook for receiving and loosely supporting a plurality of strung, elongated objects;

(d) said legs each having a width substantially less than the width of said back whereby said legs are bendable and said back is relatively rigid so as to confine any bending to said legs, said legs being bendable over the elongated objects to dispose said legs in clamping positions wherein said clamping portions extend substantially parallel to said back and are disposed in partially adjacent relation and the back, said bent portions and said clamping portions form a closed object-retaining and clamping member; and (e) end weldable stud means having one end welded to said back and its other end weldable to a metal support by a stud end welding technique, the weldable end of said stud means being substantially spaced from its fixed end to space said clamping member from the support, and said back having an area substantially greater than the cross-sectional area of said stud means and extending beyond the entire periphery of said stud means.

5. A hanger construction comprising:

(a) an elongated stud member having a first end adapted to be secured to a structural member, the stud having a second end;

(b) a plate-like clamp member having a substantially flat base portion with spaced longitudinally extending side edges;

(c) said stud being welded to the base portion at a weld spaced from the side edges thereof;

(d) said base portion extending longitudinally in both directions from said weld to spaced terminations;

(e) the clamp member including a plurality of substantially parallel, longitudinally extending crimpable fingers paralleling the longitudinal axis of the base portion and each of a transverse dimension substantially less than transverse dimension of the base portion so that said base portion is relatively rigid and immoveable and said fingers are crimpable;

(f) the clamp member including connecting means secured to the base portion and to the fingers and connecting the fingers to the base with the fingers disposed on the side of the base portion opposite the stud;

(g) said fingers being positioned transversely with respect to the axis of the stud and being crimpable without appreciable distortion of the base portion; and, (h) one of said fingers, said connecting means and said base portion together defining a generally U-shaped slot to receive and support a cable or the like loosely, and the fingers being bendable to provide parallel clamps locking a cable or the like against the base portion.

6. The device of claim 5 wherein there are a pair of fingers each having a transverse dimension approximately one-half the transverse dimension of the base portion.

7. The device of claim 6 wherein said fingers are offset and oppositely extending from said base.

8. The device of claim 6 wherein said fingers are arranged side-by-side and both define the U-shaped slot with said base portion.

References Cited in the file of this patent

UNITED STATES PATENTS

| | | |
|---|---|---|
| 661,604 | Grabler | Nov. 13, 1900 |
| 762,840 | Osborn | June 14, 1904 |
| 1,585,840 | Fahnestock | May 25, 1926 |
| 1,820,485 | Palmbush | Aug. 25, 1931 |
| 2,267,586 | Del Camp | Dec. 23, 1941 |
| 2,443,000 | Elkins | June 8, 1948 |
| 2,477,765 | Nelson | Aug. 2, 1949 |
| 2,523,785 | Sereno | Sept. 26, 1950 |
| 2,612,394 | Nelson | Sept. 30, 1952 |
| 2,631,809 | Jacobson | Mar. 17, 1953 |
| 2,675,201 | Friel | Apr. 13, 1954 |
| 2,848,594 | Aversten | Aug. 19, 1958 |
| 2,936,981 | Aversten | May 17, 1960 |
| 2,950,379 | Dash | Aug. 23, 1960 |
| 2,990,150 | Weigel et al. | June 27, 1961 |
| 3,082,984 | Larsson et al. | Mar. 26, 1963 |

FOREIGN PATENTS

| | | |
|---|---|---|
| 775,650 | Great Britain | May 29, 1957 |
| 793,322 | Great Britain | Apr. 16, 1958 |